United States Patent

[11] 3,600,596

| [72] | Inventor | John R. Aloisantoni |
| | | 722 South Ranger Blvd, Winter Park, Fla. 32784 |
| [21] | Appl. No. | 830,599 |
| [22] | Filed | June 5, 1969 |
| [45] | Patented | Aug. 17, 1971 |

[54] VEHICLE LIGHT SWITCH APPARATUS
7 Claims, 6 Drawing Figs.

[52] U.S. Cl. .................................................... 307/10, 315/77, 315/82
[51] Int. Cl. ...................................................... H02g 3/00
[50] Field of Search ........................................... 307/10, 9; 340/76; 315/77, 82, 83; 180/82, 103

[56] References Cited
UNITED STATES PATENTS

| 3,371,241 | 2/1968 | Amacher | 315/77 |
| 3,500,120 | 3/1970 | Schultz | 307/10 |

Primary Examiner—Robert K. Schaefer
Assistant Examiner—H. J. Hohauser
Attorney—Duckworth and Hobby ABSTRACT: A vehicle light switch apparatus is provided for turning the lights of a vehicle on and off automatically upon turning the windshield wipers for the vehicle on and off without otherwise affecting the main light switch for the vehicle.

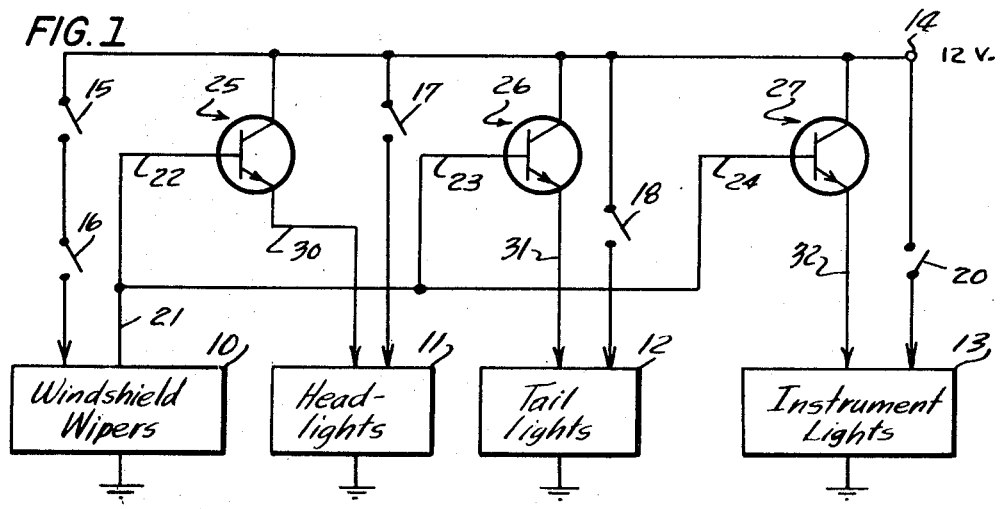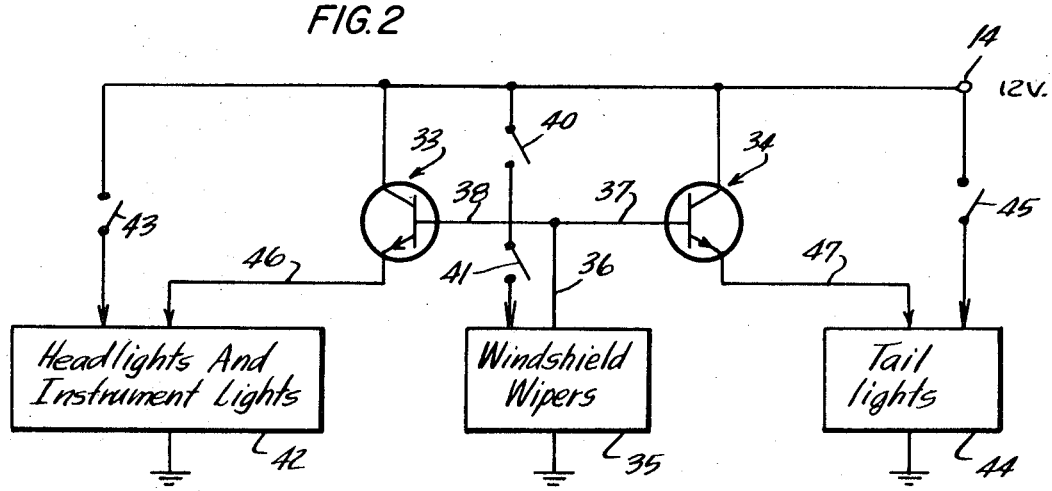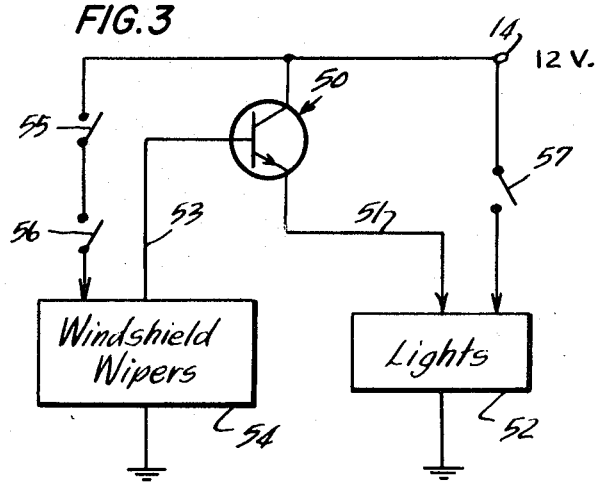
JOHN R. ALOISANTONI
INVENTOR.
BY Duckworth & Hobby
ATTORNEYS

PATENTED AUG 17 1971

JOHN R. ALOISANTONI
INVENTOR.

BY Duckworth & Hobby

ATTORNEYS

VEHICLE LIGHT SWITCH APPARATUS

BACKGROUND OF THE INVENTION

1. Field of the Invention

The present invention relates to a windshield wiper and light combination and in particular to an electrical circuit for activating the lights of a vehicle during operation of the windshield wipers. A solid state, or electromechanical, electrical circuit is provided to actuate the headlights or any other lights of a vehicle when the windshield wipers of a vehicle are turned on and not to otherwise affect the operation of the lights of the vehicle by other light switches.

2. Description of the Prior Art

In the past, vehicle—especially automobiles—have been provided with headlights, tail lights, instrument lights and other lights operated by a main switch on the panel of the vehicle which switch and lights operate independently of windshield wipers used in cleaning the windshields of the vehicle during rainy or wet weather. Windshield wipers are normally actuated by a switch which is connected through the main ignition switch which is connected through the main ignition switch of the vehicle and thus turning off the engine of the vehicle will turn off the windshield wipers automatically. Thus, when a person on rainy weather parks his car and turns off the ignition, the windshield wipers will automatically be turned off and thus avoiding the windshield wipers from running in a vehicle car. The headlights and other lights of a car have usually been connected through a main light switch which operates separately from the ignition switch, and thus parking a car with the headlights or other lights on and turning the engine off will have no effect on the lights. This is done because there are many occasions when it is desirable to have the lights on with the motor not running. However, because safety officials are encouraging the use of headlights and tail lights of an automobile during rainy or inclement weather, and since some states by statue require the lights to be on in rainy weather, the problem continuously arises of leaving the lights on after parking the vehicle. The operation of lights during daylight hours are not normally visible to the driver who tends to forget that he turned the lights on when he parks the car. There is also a tendency to forget to turn the lights on during rainy weather and thus increase the hazard in driving in inclement weather while violating the statute in states requiring that they be turned on. The present invention advantageously overcomes these problems by providing a simple solid state circuit foe switching the vehicle lights on whenever the windshield wiper is switched on without otherwise interfering with the operation of the main light switch of the vehicle, and turns the lights off when the car is stopped and the ignition is shut off.

It has been suggested in the past to provide a combination windshield wiper with a light on the wiper blades to provide a warming vehicles other vehicles and pedestrians in which the light would swing back and forth with the windshield wiper. Finally, there have also been several devices suggested in the past for washing and cleaning the headlights, and in one of these devices it has been suggested to have the vehicle headlights controlled by the headlight energizing circuit.

SUMMARY OF THE INVENTION

A vehicle light switching circuit is provided for attachment to a vehicle and for operating independent of the vehicle's light switch or switches whenever the windshield wipers of the vehicle are in operation. The switching circuit is connected to an electrical source such as the battery of an automobile and is also connected to the light circuits of the vehicle in a manner that when the switch is closed the lights will come on. The windshield wiper circuit is connected to the switching circuit and adapted to actuate or close the switch and thus turn on the vehicle lights. For instance, the windshield wipers circuit can be connected to the base electrodes of switching transistors while the battery source could be connected to the collector electrode and the light circuit to the emitter electrodes of switching transistors. Thus, when the ignition is on and the windshield wipers are actuated, the load on the windshield wipers will be placed on the base electrodes of the transistors and thus close the circuits and allow current to flow from the collector to the emitter electrodes and operate the lights of the vehicle. Turning off or opening either the windshield wiper switch or the ignition switch of the vehicle will disengage the windshield wipers and remove the load from the base electrodes of the switching transistors and thus disengage the circuit to the lights. The light circuits will not be otherwise affected and the light switches, if turned on, will leave the lights on even after the windshield wipers have been turned off.

A system is also provided for actuating the light circuits of the vehicle by an electromagnetic relay such as a solenoid, or the like, which is operated by the load being placed on the windshield wipers to actuate a switch or switches for activating or turning on the lights of a vehicle. BRIEF DESCRIPTION OF THE DRAWINGS Other objects, features and advantages of this invention will be apparent from a study of the written description and the drawings, in which:

FIG. 1 shows a schematic diagram of one of the present embodiment of the present invention in which the loads of the circuits have been shown in blocks for clarity;

FIG. 2 illustrates a second embodiment of the present invention;

FIG. 3 illustrates a third solid state embodiment of the present invention;

Figure 6:
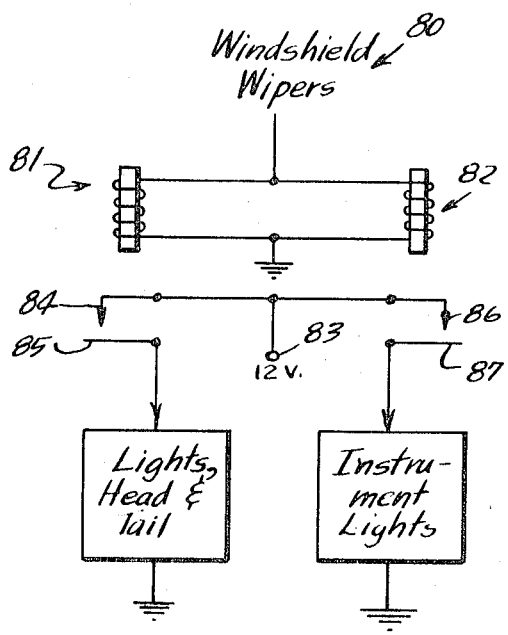

FIG. 6 illustrates yet another embodiment using an electromechanical relay.DESCRIPTION OF THE PREFERRED EMBODIMENT Referring now to FIG. 1, the block 10 on the diagram indicates the windshield wipers or windshield wiper load in the circuit, while block 11 indicates the headlights and block 12 the tail lights, and block 13 the instrument light of a vehicle such as an automobile. Each of the blocks has aground connection, as indicated. The windshield wipers are connected to a 12-volt source 14 thorough the automobile ignition switch indicated at 15 and the windshield wiper switch 16, so that when the ignition switch indicated at 15 and the windshield wiper switch 16, so that when the ignition switch 15 is closed and the windshield wiper switch 16 is closed, a completed circuit will be formed between the voltage source 14 through the windshield wiper load 10 to ground. Similarly, the headlights 11 are connected directly to a load 14 through a switch 17, which is the main light switch, through the headlight load to ground, and the tail lights are connected through a switch 18 from the source 14 through the load 12. Switch 18 may be the same as switch 17 or a combination switch in which both are operated by the same control. Finally, the source 14 is connected to the instrument lights 13 through a switch 20 in the same manner as switches 17 and 18 and again may be the same or in combination with the switches 17 and 18. An electrical conductor 21 is connected between the windshield wipers 10 and conductors 22, 23 and 24 which are connected to the base electrodes of switching transistors 25, 26 and 27 respectively. Lines 22, 23 and 24 are indicated as conductors but may have a suitable dropping resistor therein to supply the base with a lower potential than that supplied to the collector of switching transistors 25, 26 and 27. This would of course depend upon particular switching transistors that were used in the circuit, and if it were desired to use such a dropping resistor it could be in the form of a resistance wire. The switching transistors 25, 26 and 27 each have their collectors connected to the voltage source 14 and their emitter electrodes connected t,ines 30, 31 and 32 respectively. Line 30 is connected to the headlights 11, line 31 to the tail lights 12 and line 32 to the instrument lights 13. Thus when the ignition switch 15 and windshield wiper switch 16 are closed the windshield wipers of the vehicle will operate and will place a voltage on lines 22, 23 and 24 which voltage will be placed on the base electrodes of switching transistors 25, 26, 27, allowing current to flow from the source 14 through switching transistors 25, 26 and 27, through lines 30, 31 and 32 and actuating headlights 11, tail lights 12 and instrument panels 13 respectively When either ignition switch 15 or windshield wiper switch 16 are opened, the bias voltage will be removed from the lines 22, 23 and 24 thus preventing the flow of current through transistors 25, 26 and 27 and turning off the headlights, tail lights and instrument lights. Switches 17, 18 and 20 on the other hand, operate independent of the transistor circuits and if any of these switches are closed, the respective headlights 11, tail lights 12 and instrument lights 13 will remain on. Switches 17, 18 and 20 can be seen to operate entirely independent of the transistor circuit and will have no effect on the windshield wipers 10.

Turning now to FIG. 2 there can be seen that a circuit similar to that of the embodiment of FIG. 1, but having two transistors 33 and 34, which are also switching transistors having their base electrodes connected to the windshield wiper circuit 35 through a conductor 36, and a conductor 37 connected to the base electrode of transistor 34, and a conductor 38 connected to the base electrode of transistor 33. The main ignition switch 40 for the vehicle connects a source 14 to the windshield wipers 35 through a windshield wiper switch 41. Headlight and instrument lights 42 are connected to electrical source 14 through light switch 43 and tail lights 44 are connected to the electrical source 14 through the tail lights switch 45 which could be the same or in combination with switch 43. In any event, switch 43 will turn on the headlights and instrument lights and switch 45 will turn on the tail lights. Electrical source 14 is connected to the collector electrodes of switching transistors 33 and 34 while the emitter electrode of transistor 33 is connected to a line 46 which is also connected to the headlights and instrument lights 42, while the emitter electrode of transistor 34 is connected to line 47 which in turn is connected to the tail lights 44. When the windshield wipers are activated by having both switches 40 and 41 closed, a load is placed on the base electrodes of transistors 33 and 34, and current will pass through transistors 33 and 34 and turn on the headlights, instrument lights and tail lights. Again in this embodiment, as in the last, it may be necessary to have dropping resistors in lines 37 and 38 to reduce the voltage being placed on the bases of transistors 33 and 34 which will of course depend upon the types of transistors used.

FIG. 3 illustrates an embodiment in which one transistor is utilized in a circuit and has its collector connected to the light circuit 52. Transistor 50 also has it s base electrode connected to a line 53 which in turn is connected to the windshield wipers circuit 54. The main ignition switch 55 and the windshield wiper switch 56 must both be closed to activate the windshield wipers. However, the electrical source 14 is also connected to the lights 52 by switch 57 which will turn the lights up upon closing the switch 57. Upon activating the windshield wipers 54, a load will be placed on the base electrode of transistor 50 which will allow current to flow from the electrical source 14 through line 51 and activate the lights 52. When either switch 55 or 56 are opened, the windshield wipers will stop, the load will be removed from the base of the transistor 50 and the lights will be turned off.

It should be clear at this point that three embodiments of an invention have been provided for operating the lights of an automobile when the windshield wipers are turned on. The applicant does not intend to be limited to any particular components for the operation of the invention but it has been found that the following transistor may successfully be used in the invention where a 12-Volt battery source is being used: Transistor 2N 3055, in FIG. 3.

Figure 4:
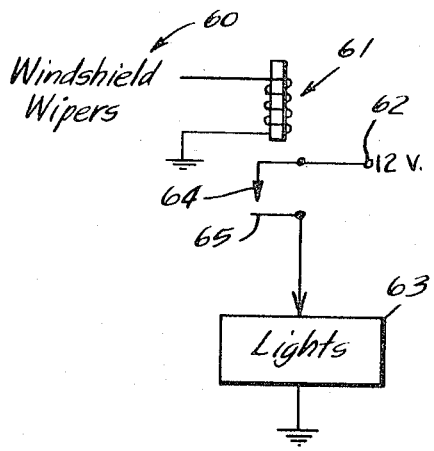
FIG. 4 illustrates an embodiment of the invention utilizing electromechanical relay.

Referring now to FIG. 4, there is shown an embodiment of the present invention in which an electromechanical relay is utilized in operating the lights when the windshield wipers are turned on. The windshield wipers are indicated at 60 connected to a relay indicated generally at 61 which relay is connected to the electrical source 62 which is indicated as being 12 Volts. The lights 63 are connected to the relay 61 so that when a load is placed on the windshield wipers, the relay 61 will be activated to close the contacts 64 and 65 which operate the lights 6 which are connected to ground.

Figure 5:
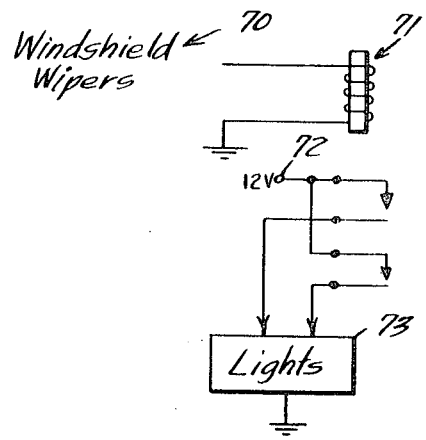
FIG. 5 illustrates another embodiment using an electromechanical relay.

Reference is now made to FIG. 5 in which the windshield wipers are indicated as 70 connected to a relay indicated as 71 which relay is also connected to 12-Volt source 72 which relay may be double pole single throw type relay for operating the lights 73 which are connected to ground.

Turning now to FIG. 6, another embodiment is shown in which the windshield wipers 80 are connected to dual relays 81 and 82, both relays being connected to an electrical source 83 and operating respectively by contacts 84 and 85, and contacts 86 and 87. Relay 81 operates the headlights and tail lights while relay 82 operates the instrument lights of the vehicle whenever the windshield wipers are turned on.

It should be independent that in these last three embodiments the lights have independent connections to the voltage sources and that the windshields wipers will normally be turned on by the windshield wiper switch will normally be turned on by the windshield wiper switch only when the ignition is turned on, similar to the embodiments of 1 through 3, and that the relays operate on an electromechanical principle such as solenoids, or the like, in which an electrical magnet is activated by the application of an electrical source being applied thereto which in turn operates contacts to close the circuit for the lights. The contacts disengage when the voltage is removed from the electrical magnet.

At this point it should be clear that a vehicle light actuating circuit has been provided to operate upon turning on the windshield wipers of the vehicle without otherwise interfering with the operation of the light switch of the vehicle. It should be clear also that other embodiments are anticipated as being within the scope of the invention. One such embodiment and connection with FIGS. 1 through 3 might include the use of diodes in place of the transistors provided therein, and this is anticipated as being within the scope of the present invention. It should also be pointed out that it is anticipated that a disabling switch may be provided for disabling the entire or a portion of the present circuit without departing from the spirit and scope of the invention.

This invention is not to be constructed as limited to the particular forms disclosed herein, since these are to be regarded as illustrative rather than restrictive.

I claim:

1. A solid state vehicle electrical circuit for actuating the vehicle lights when the vehicle windshield wipers are in operation, comprising in combination:
 a. electrical source means;
 b. a solid state switch means connected between said electrical source means and vehicle light circuit, said solid state switch means having a closed position having a low resistance to the flow of current ans an open position having a high resistance to the flow of electrical current;
 c. windshield wiper circuit having switch means, said switch means having a closed position and an open position which are adapted to operate said vehicle windshield wipers when in a closed position;
 d. said solid state switch means being connected to said windshield wiper circuit and adapted to close said solid state means whenever said windshield wiper circuit switch means is closed.
 c. said solid state switch means having at least one transistor having base, collector and emitter electrodes with each said base electrode being connected to said electrical source means and each said emitter electrode being connected to said vehicle light circuit.

2. The apparatus according to Claim 1 in which said electrical source means is a battery.

3. A solid state vehicle electrical circuit for actuating the vehicle lights when the vehicle windshield wipers are in operation, comprising in combination:
 a. electrical source means;
 b. a solid state switch mean connected between said electrical source means and vehicle and light circuit, said solid state switch means having a closed position having a low resistance to the flow of current and an open position having a high resistance to the flow of electrical current;
 c. windshield wiper circuit having switch means, said switch means having a closed position and an open position which are adapted to operate said vehicle windshield wipers when in a closed position;
 d. said solid state switch means being connected to said windshield wiper circuit and adapted to close said solid state means whenever said windshield wiper circuit switch means is closed;
 e. said solid state switch means having at least one transistor having base, emitter and collector electrodes with each said base electrode being connected to said windshield wiper circuit and each said emitter electrode being connected to said electrical source means and each said collector electrode being connected to said vehicle light circuit.

4. The apparatus according to claim 3 in which said solid state switch means has a plurality of transistors.

5. The apparatus according to claim 4 in which said windshield wiper circuit switch means includes the vehicle ignition switch and the windshield wiper switch.

6. The apparatus according to claim 5, in which the vehicle light circuit includes a light switch means connected between the electrical source means and the vehicle lights for turning said lights on and off.

7. The apparatus according to claim 2 in which said solid state switch means has a plurality of transistors.